Patented Aug. 16, 1949

2,479,306

UNITED STATES PATENT OFFICE 2,479,306

COPOLYMERS OF STYRENE WITH FURAN OR MONOALKYL FURAN

Theodore L. Cairns, Wilmington, Del., Arthur W. Larchar, Mendenhall, Pa., and Blaine C. McKusick, Wilmington, Del., assignors to E. I. du Pont de Nemours & Company, Wilmington, Del., a corporation of Delaware No Drawing. Application March 1, 1948, Serial No. 12,478

2 Claims. (Cl. 260—88.1)

This invention relates to polymeric materials. More particularly, it relates to solid copolymers of furan and alkylfurans.

Furans and alkylfurans have been polymerized per se by conventional procedures or condensed with vinyl compounds. The products obtained heretofore by polymerization or copolymerization have been oils or low melting resins; with vinyl compounds, the products have been monomeric 1:1 addition compounds, e. g., of the type given by the Diels-Alder reaction. It has not heretofore been possible to obtain solid, high-melting copolymers of furans, in spite of the obvious advantages of such polymers over low-melting resins from the standpoint of ease of handling, adaptability for use as molding powders or non-tacky coating material, etc.

An object of this invention is to provide solid, high-melting copolymers of furan and monoalkylfurans. Another object is to provide a method for preparing these polymers. Other objects will appear hereinafter.

These objects are accomplished by the invention of copolymers, melting above 100° C., of furan and monoalkylfurans with polymerizable ethylenic compounds having, as the sole aliphatic carbon to carbon unsaturation, a double bond attached to a terminal methylene group, and of a process for preparing these copolymers which comprises subjecting the mixed monomers to a pressure above 4000 atmospheres and a temperature above 125° C. until polymerization occurs.

The term "copolymer" as used herein refers only to high molecular weight, i. e., macromolecular, materials. It does not, of course, include any monomeric 1:1 addition products of furans with unsaturated compounds such as are produced in the Diels-Alder reaction.

Means of producing extremely high pressures of the order of 4000 to 25,000 atmospheres and even higher have been described elsewhere in the technical literature. The particular manner of applying the pressure is not a part of this invention since any suitable apparatus may be employed. The apparatus used in the examples that follow is described in its essentials in "The Physics of High Pressure" by P. W. Bridgman (MacMillan Co. 1931) at pages 41–48.

In its preferred embodiment, the process is carried out without any added polymerization catalyst. This is for the reason that in the systems under consideration, which are generally difficultly polymerizable, many active catalysts may preferentially accelerate the polymerization of one or the other monomer so that the product contains little or no copolymer.

The invention is illustrated by the following examples, in which parts are by weight.

Example I

A solution of 2.55 parts of furan and 2.55 parts of acrylonitrile in 5.1 parts of benzene was subjected to a pressure of 6000–7300 atmospheres at 200° C. for 18 hours. There was obtained 4.8 parts of a copolymer which contained 12.79% of nitrogen, corresponding to 48.5% of polyacrylonitrile. The copolymer softened without melting at 200–210° C. It could be pressed at 210° C. into light-colored films. The copolymer was insoluble in benzene, alcohol, ether, acetone, acetic acid and dioxane at the boiling point. It was soluble in phenol and dimethyl formamide.

Example II

A mixture of 0.94 part of furan and 0.80 part of ethylene was subjected to a pressure of 6700–7300 atmospheres at 200° C. for 18 hours. The resulting copolymer (1.08 parts) softened without melting at 180–190° C. It contained 73.64% carbon and 8.08% hydrogen, indicating approximately 30% of polyethylene in the copolymer. It could be pressed at 190° C. into a solvent-resistant film. The copolymer was insoluble in alcohol, benzene and dimethyl formamide, slightly soluble in phenol. The critical importance of extremely high pressures is shown by the fact that at the same temperature but at a pressure of 2000 atmospheres, ethylene does not enter into the polymerization. The reaction product consists only of polyfuran.

Example III

A solution of 3.98 parts of styrene and 1.33 parts of furan in 5.31 parts of benzene was subjected to a pressure of 6600–7300 atmospheres at 200° C. for 20 hours. The benzene-insoluble copolymer was combined with that resulting from another, substantially identical experiment. The total copolymer amounted to 9 parts. It contained 86.67% carbon and 7.50% hydrogen, indicating a content of approximately 77% polystyrene (ratio polystyrene to polyfuran 2:1 on a molar basis). The product prepared under these conditions had a significantly higher softening point (123° C.) than commercial polystyrene (98° C.) at comparable hardness and impact strength. It could be pressed into films at 160–210° C. The copolymer was insoluble in alcohol and acetone. It was slightly soluble in xylene, phenol and dimethyl formamide at the boiling point.

It is noteworthy that when styrene (171 parts) and furan (112 parts) are polymerized in benzene (165 parts) at the same temperature of 200° C. for 18.5 hours but under autogenous pressure, no copolymer is obtained.

Example IV

A solution of 0.83 part of furan and 0.77 part of vinyl chloride in 0.83 part of benzene was subjected to a pressure of 6800–7300 atmospheres at 160° C. for 20⅓ hours. The copolymer (0.84 part) was infusible and insoluble in the common organic solvents such as benzene, xylene, dimethyl formamide and cyclohexanol. It had a chlorine content of 11.51% corresponding to a polyvinyl chloride content of 20.5%.

Example V

A mixture of 4 parts of 2-methylfuran and 4 parts of styrene was subjected to a pressure of 6400–7300 atmospheres at 200° C. for 15 hours. The resulting copolymer (6.76 parts) contained 82.73% carbon and 7.45% hydrogen, indicating a molar ratio of styrene to 2-methylfuran of 1:1, or a polystyrene content of about 55%. The copolymer could be pressed into clear, transparent films at 220° C. It was insoluble in benzene, xylene and alcohol, soluble in boiling phenol.

The monomeric materials suitable for use in this invention include furan and the monoalkylfurans, e. g., 3-methylfuran, 2-ethylfuran, 2-propylfuran, 3-isopropylfuran, 2-butylfuran, etc. The most readily available alkylfurans are those in which the furan nucleus bears a single alkyl substituent of 1 to 4 carbon atoms, and these are therefore preferred. As the comonomers there may be used any polymerizable unsaturated compound having, as the sole aliphatic carbon to carbon unsaturation, a double bond attached to a terminal methylene group. Additional examples of suitable comonomers are isobutylene, vinyl acetate, vinyl chloroacetate, vinyl bromide, furylethylene, acrylic and methacrylic acids and their esters, such as methyl methacrylate, methacrylamide, vinylnaphthalene, 1,1-dichloroethylene, methylvinyl ether, etc. The preferred comonomers, because of their greater reactivity, are those in which the carbon doubly bonded to the methylene group is attached to radicals which, when substituted for hydrogen in the methyl group of acetic acid, give an acid having an ionization constant whose logarithm is between −4.9 and −2.4. In other words, the preferred comonomers have the formula

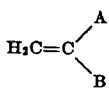

wherein both A and B are radicals, which when attached to the group —$CH_2$—COOH, give acids having ionization constants whose logarithms are between −4.9 and −2.4. The logarithms of the ionization constants of a number of such acids are given in "Theory of Organic Chemistry" by Branch and Calvin, page 224 (Prentice-Hall, New York, 1946) or can be calculated from ionization constants given in reference books. Included among such radicals are H, —$CH_3$, —CN, —COOH, —COOCH$_3$, —COOC$_2$H$_5$, —C$_6$H$_5$, Cl, F, etc. Thus, the preferred monomers include ethylene, propylene, acrylonitrile, methyl acrylate, methyl methacrylate, ethyl acrylate, acrylic acid, beta-chloroacrylic acid, styrene, vinyl chloride, vinyl fluoride, etc. The copolymers, in order to possess the desired physical characteristics, should contain between 5 and 95% by weight of furan or alkylfuran, the remainder being the vinylidene compound copolymerized therewith.

Preferably the copolymers contain between 20 and 80% by weight of furan or alkylfuran. Since, under the polymerization conditions described, the ratio of the components in the copolymer often corresponds fairly closely to the ratio of the monomers, it is desirable to start with a monomer mixture containing also 5 to 95%, and preferably between 20 and 80% of furan or alkylfuran, the remainder being the vinylidene comonomer. The copolymers of this invention are high melting solids having softening points above 100° C. They are insoluble in water and their solubility in organic solvents varies a great deal depending upon the nature and proportions of the comonomers.

As already indicated, it is essential to operate above a certain minimum pressure and temperature if high melting copolymers are to be obtained. Obviously, the critical minima cannot be determined with complete accuracy. Nevertheless, it appears on the basis of present knowledge that the pressure should be at least 4000 atmospheres and the temperature at least 125° C. The maximum pressure is determined solely by what the equipment will stand, and it can be as high as 25,000 atmospheres or more if mechanical limitations permit. A satisfactory operating range is 4000–10,000 atmospheres. The temperature is limited only by the decomposition point of the reactants, a satisfactory operating range being 150–250° C. The reaction time depends of course on the other conditions, and also on the nature of the reactants and the yield of copolymer it is desired to obtain. In general, reaction times between 2 and 20 hours are sufficient.

The polymerization can be carried out in the absence of any solvent or diluent. However, it is often desirable to have a solvent present, particularly at the higher reaction temperature, to prevent possible decomposition of heat-sensitive reactants in the case of highly exothermic polymerizations. Any non-polymerizable liquid which is a solvent for the monomers may be used, including, for example, benzene, toluene, the xylenes, n-hexane, cyclohexane, tetrahydrofurans, chlorofuran, carbon tetrachloride, dibutyl ether, phenol, methanol, ethanol, etc.

The high melting furan and monoalkylfuran copolymers obtained according to this invention are particularly useful as molding powders, ingredients of coating compositions, etc.

As many apparently widely different embodiments of this invention may be made without departing from the spirit and scope thereof, it is to be understood that we do not limit ourselves to the specific embodiments thereof except as defined is in the appended claims.

We claim:

1. A process for obtaining copolymers which comprises heating a mixture of styrene and a substance selected from the group consisting of furan and monoalkyl furans, in which the alkyl group contains from 1 to 4 carbon atoms, under a pressure of at least 4000 atmospheres and at a temperature of at least 125° C. and below the decomposition temperature of the furan, monoalkyl furan and styrene, said mixture containing from 20% to 80% of said substance by weight of said mixture.

2. The copolymerization product of a mixture of styrene and a substance selected from the group consisting of furan and monoalkyl furans in which the alkyl group contains from 1 to 4 carbon atoms, said mixture containing from 20% to 80% of said substance by weight of said mixture.

THEODORE L. CAIRNS.
ARTHUR W. LARCHAR.
BLAINE C. McKUSICK.

REFERENCES CITED

The following references are of record in the file of this patent:

UNITED STATES PATENTS

| Number | Name | Date |
|---|---|---|
| 1,952,116 | Bridgman | Mar. 27, 1934 |

OTHER REFERENCES

Boeseken Recueil des Travaux Chimiques des pays-bas, vol. 50, pages 1023–1034 (1931).

Michalek Chemical and Engineering News, vol. 22, pages 1559–1563 (1944).

Alder Berichte der Deutschen Chemischen Gesellschaft, vol. 76B, pages 183–205 (1943). (Copy in Scientific Libr.)

Mowry Journ. Amer. Chem. Soc., vol. 69, pages 573–575 (1947). (Copy in Scientific Libr.)